US008767116B2

(12) United States Patent
Yamamoto

(10) Patent No.: US 8,767,116 B2
(45) Date of Patent: Jul. 1, 2014

(54) IMAGING APPARATUS, IMAGING METHOD AND IMAGING PROGRAM FOR DISPLAYING AN ENLARGED AREA OF SUBJECT IMAGE

(75) Inventor: Katsuya Yamamoto, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 185 days.

(21) Appl. No.: 13/409,811

(22) Filed: Mar. 1, 2012

(65) Prior Publication Data

US 2012/0229675 A1  Sep. 13, 2012

(30) Foreign Application Priority Data

Mar. 7, 2011 (JP) ................................. 2011-048523

(51) Int. Cl.
*H04N 5/222* (2006.01)
*H04N 5/232* (2006.01)

(52) U.S. Cl.
CPC ....... *H04N 5/23212* (2013.01); *H04N 5/23293* (2013.01)
USPC ..................................... 348/346; 348/333.03

(58) Field of Classification Search
CPC .......... H04N 5/23212; H04N 5/23219; H04N 5/23293; H04N 5/2628
USPC ...................... 348/333.03, 333.05, 346, 240.2
See application file for complete search history.

(56) References Cited

U.S. PATENT DOCUMENTS

| 7,492,406 | B2* | 2/2009 | Park et al. | 348/333.05 |
|---|---|---|---|---|
| 7,511,745 | B2* | 3/2009 | Aoyama | 348/240.2 |
| 7,589,778 | B2 | 9/2009 | Nakahira | |
| 7,787,025 | B2* | 8/2010 | Sanno et al. | 348/231.3 |
| 7,791,669 | B2* | 9/2010 | Nonaka | 348/349 |
| 7,865,075 | B2* | 1/2011 | Watanabe | 396/147 |
| 8,400,556 | B2* | 3/2013 | Aoki et al. | 348/345 |
| 2005/0046730 | A1* | 3/2005 | Li | 348/333.12 |
| 2008/0068487 | A1* | 3/2008 | Morita | 348/333.05 |
| 2009/0009622 | A1* | 1/2009 | Yoshida et al. | 348/222.1 |
| 2009/0185064 | A1* | 7/2009 | Maniwa | 348/333.11 |
| 2009/0244354 | A1* | 10/2009 | Sakaguchi | 348/333.02 |
| 2013/0176472 | A1* | 7/2013 | Kang | 348/333.01 |

FOREIGN PATENT DOCUMENTS

| JP | 2003-189136 |   | 7/2003 |
|---|---|---|---|
| JP | 2007281646 A | * | 10/2007 |
| JP | 2008098739 A | * | 4/2008 |
| JP | 4141800 |   | 6/2008 |
| JP | 2009177316 A | * | 8/2009 |
| JP | 2010279060 A | * | 12/2010 |

* cited by examiner

*Primary Examiner* — John Villecco
(74) *Attorney, Agent, or Firm* — Oblon, Spivak, McClelland, Maier & Neustadt, L.L.P.

(57) ABSTRACT

An imaging apparatus includes an imaging lens forming an optical image of a subject, an image pickup device outputting an image signal according to the optical image of the subject, a display device displaying a subject image according to the image signal, an image processor converting the image signal to data in an image data format to be displayed on the display device, and a storage device storing a plurality of pieces of positional information respectively specifying a plurality of enlargement areas to be enlarged in the subject image. The image processor has an enlarged image generation device generating an enlarged image of each of the plurality of enlargement areas based on the positional information stored in the storage device, and an enlargement display device displaying the plurality of enlarged images on the display device.

9 Claims, 11 Drawing Sheets

IMAGING APPARATUS, IMAGING METHOD AND IMAGING PROGRAM FOR DISPLAYING AN ENLARGED AREA OF SUBJECT IMAGE

CROSS REFERENCE TO RELATED APPLICATIONS

The present application is based on and claims priority from Japanese Application Number 2011-048523, filed on Mar. 7, 2011, the disclosure of which is hereby incorporated by reference herein in its entirety.

BACKGROUND OF THE INVENTION

1. Field of the Invention

The present invention relates to an imaging apparatus in which, when a focusing operation is manually performed while confirming a subject image displayed on a monitor, a plurality of areas in the subject image displayed on the monitor are enlarged and displayed at the same time. The present invention also relates to an imaging method and an imaging program for operating the imaging apparatus.

2. Description of the Related Art

A digital camera as an imaging apparatus having a manual mode has been known. Here, the manual mode is an imaging mode where a focus processing for manually driving a focus lens to focus on a subject is performed. Such an imaging apparatus has a display device for visually confirming whether or not the imaging apparatus is focused on the subject.

For example, a single-lens reflex type imaging apparatus has a display device which is an optical finder on which an optical image of a subject obtained via an imaging optical system is displayed so as to be visually confirmed. On the other hand, a so-called compact type imaging apparatus has a display device which is not an optical finder but a liquid crystal monitor provided on a back side of the imaging apparatus.

When photographing in a manual mode in the compact type imaging apparatus, focus adjustment, that is, an operation for driving a focus lens and adjusting a focus on the subject is performed while visually confirming a subject image displayed on the liquid crystal monitor. The image displayed on the liquid crystal monitor is an image of a whole imaging field of view. Therefore, in some cases, it is difficult to judge a focused state when it is required to focus on a specific part of the subject image.

In order to solve the above problem, an imaging apparatus having a function of enlarging and displaying a part of an imaging field of view on a liquid crystal monitor has been known (see, for example, Japan Patent Number 4141800). In the imaging apparatus disclosed in Japan Patent Number 4141800, a part to be enlarged can be manually specified and the specified part is enlarged and displayed. Thereby, it is easy to visually confirm a focus state of the part of the whole imaging field of view. However, if a photo opportunity comes in the middle of the operation for specifying a part to be enlarged, the photo opportunity is missed. Especially if one part is judged to be enlarged after another part is judged to be enlarged instead, operations and processings for enlarging and displaying the one part are required so that quick operation cannot be achieved.

Then, an imaging apparatus in which a part to be enlarged and displayed may be quickly specified without missing photo opportunities has been known (see, for example, Japan Patent Application Publication Number 2003-189136). In the imaging apparatus, a photographer's line of sight to the whole imaging field of view is specified and the part viewed by the photographer is enlarged and displayed based on the line of sight. However, the imaging apparatus disclosed in Japan Paten Application Publication Number 2003-189136 requires a sensor for detecting an eye movement of the photographer and configurations for specifying the photographer's line of sight based on information detected by the sensor. A single-lens reflex type imaging apparatus may have such a sensor and configurations. However, it is difficult for a compact type imaging apparatus to have them because of increase of size and manufacturing cost.

SUMMARY OF THE INVENTION

An object of the present invention is to provide an imaging apparatus, an imaging method and an imaging program, in which a plurality of parts of a subject image can be enlarged and displayed on a monitor at the same time and a demand of a quick and easy manual focus adjustment can be satisfied even in case where a part to be enlarged changes from moment to moment even if the imaging apparatus is a compact type imaging apparatus without an optical finder.

To achieve the above object, an imaging apparatus according to an embodiment of the present invention includes an imaging lens forming an optical image of a subject, an image pickup device outputting an image signal according to the optical image of the subject, a display device displaying a subject image according to the image signal, an image processor converting the image signal to data in an image data format to be displayed on the display device, and a storage device storing a plurality of pieces of positional information respectively specifying a plurality of enlargement areas to be enlarged in the subject image. The image processor has an enlarged image generation device generating an enlarged image of each of the plurality of enlargement areas based on the positional information stored in the storage device, and an enlargement display device displaying the plurality of enlarged images on the display device.

BRIEF DESCRIPTION OF THE DRAWINGS

FIG. 14A showing "enlargement full screen, without guide", FIG. 14B showing "superimposing background", and FIG. 14C showing "enlargement full screen, with guide".

FIG. 15A showing the subject image, and FIG. 15B showing a "portrait enlargement".

FIG. 16A showing the subject image and FIG. 16B showing a "group enlargement".

DETAILED DESCRIPTION OF THE PREFERRED EMBODIMENTS

Figure 1:
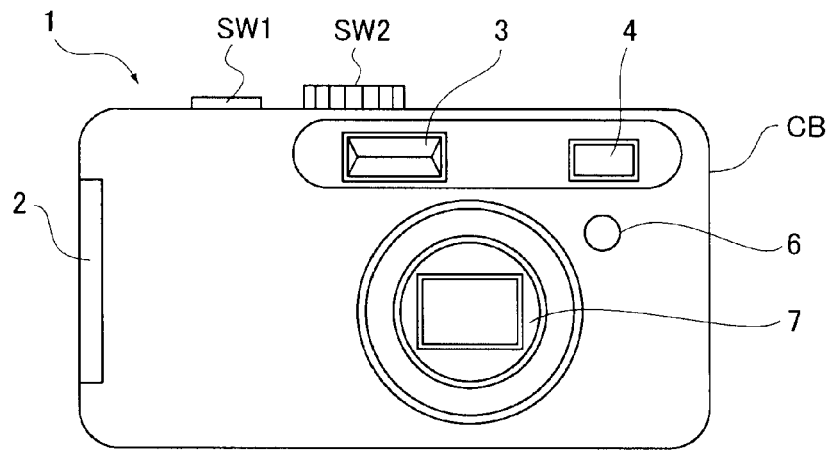
FIG. 1 is a front view showing an example of a camera as an imaging apparatus according to the present invention.
Figure 2:
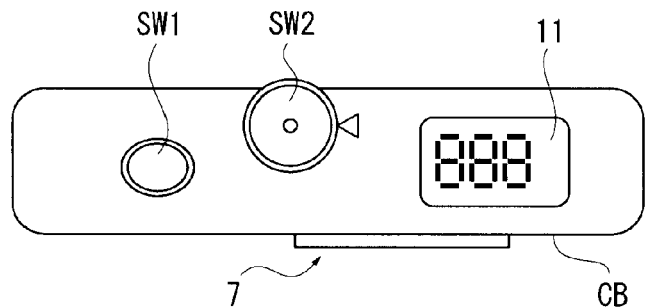
FIG. 2 is a plan view showing the example of the camera as the imaging apparatus according to the present invention.
Figure 3:
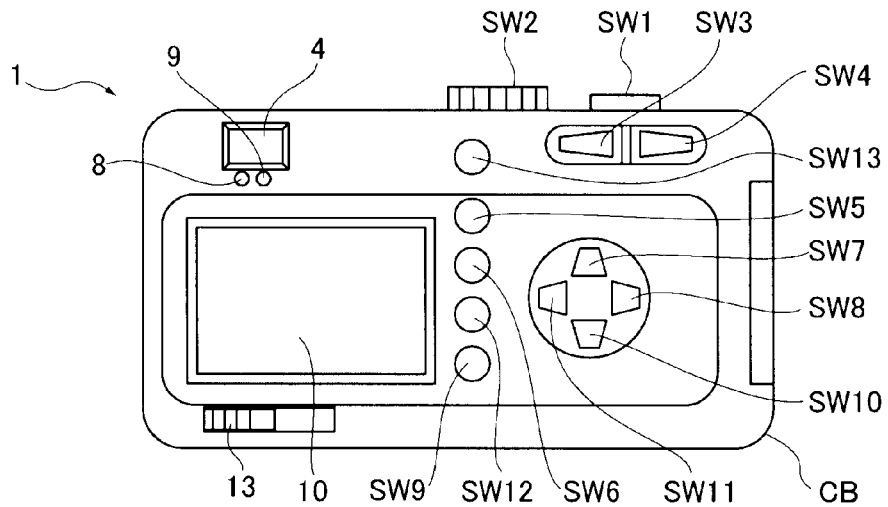
FIG. 3 is a back view showing the example of the camera as the imaging apparatus according to the present invention.
Figure 4:
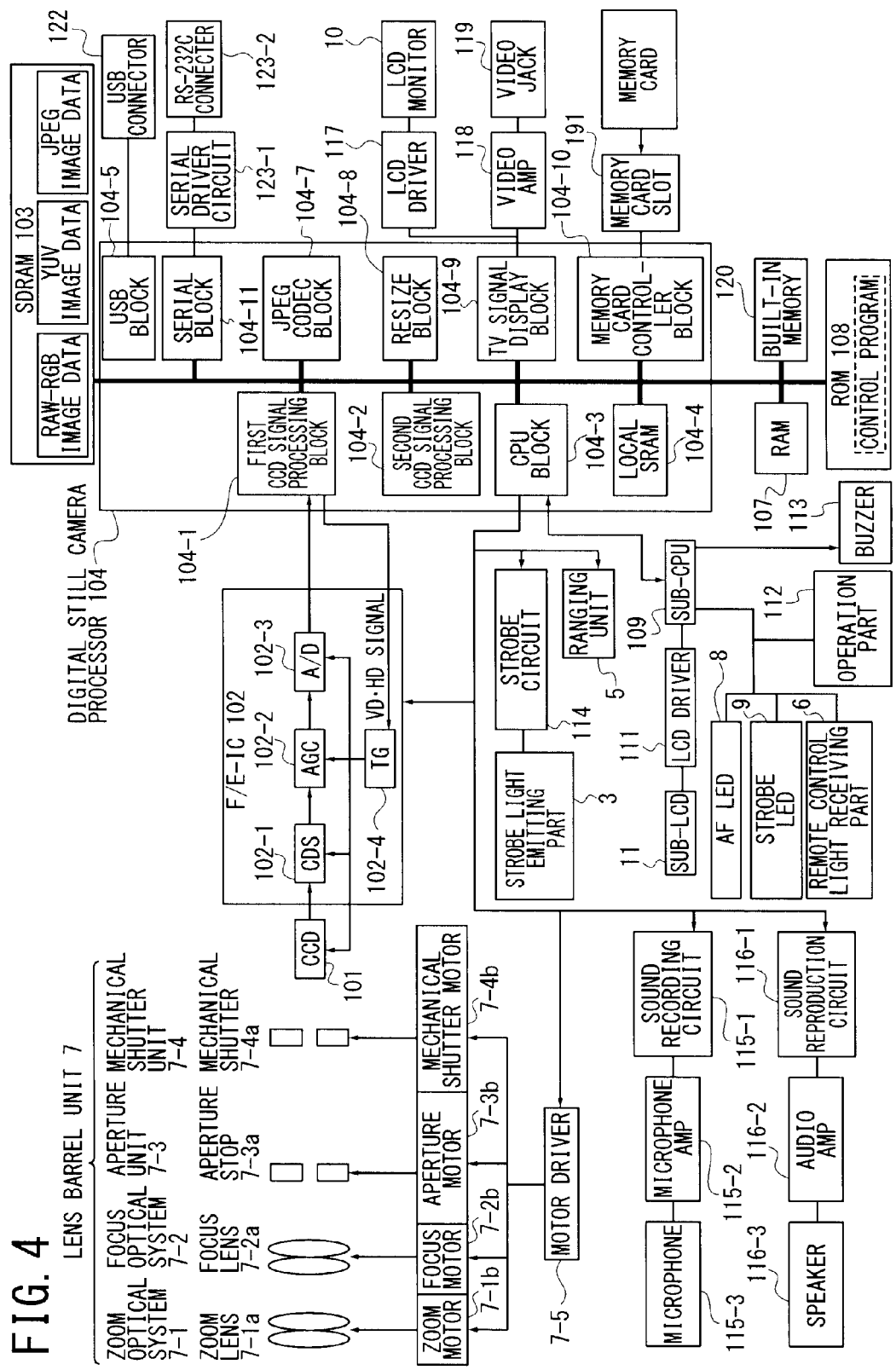
FIG. 4 is a function block diagram showing an example of an electronic control system of the imaging apparatus.

Hereinafter, an imaging apparatus according to an embodiment of the present invention will be described with reference to the drawings. FIGS. 1 to 3 shows an example of an appearance of a digital camera as an example of the imaging apparatus according to the present invention. FIG. 1 is a front view, FIG. 2 is a top view, and FIG. 3 is a back view. As shown in FIG. 1, on a front side of a camera body CB as a case of the imaging apparatus 1, a strobe light emitting part 3, an object side of a finder 4, a remote-control light receiving part 6 and a lens barrel unit 7 forming an imaging optical system including an imaging lens are provided. On one side part of the camera body CB, a cover 2 for a memory card loading part and a battery loading part is provided. In FIG. 2, on the upper side of the camera body CB, a release switch SW1, a mode dial SW2, and a sub liquid crystal display (hereinafter, LCD) (sub LCD) 11 are provided.

In FIG. 3, on a back side of the camera body CB, an eyepiece part of the finder 4, an AF light emitting diode (hereinafter, LED) 8, a strobe LED 9, an LCD monitor 10 as a displaying device to display a subject image obtained via the imaging optical system, an enlarged image and each setting screen, a power switch 13, a wide angle zoom switch SW3, a telephoto zoom switch SW4, a self-timer switch SW5 for setting or releasing a self-timer, a menu switch SW6, an upward and strobe setting switch SW7, a right switch SW8, a display switch SW9, a downward and macro switch SW10, a left and image confirming switch SW11, an OK switch SW12, and a quick access switch SW13 are provided.

Next, an example of function blocks of the imaging apparatus according to the present invention will be explained. Each operation (processing) in the imaging apparatus according to an example of the present invention is controlled by an imaging program according to an example of the present invention operated in a digital camera processor 104 (hereinafter, referred to as processor 104) configured as a digital signal processing integrated circuit (IC) and the like. The processor 104 which is an image processor, includes a first charge coupled device (CCD) signal processing block 104-1, a second CCD signal processing block 104-2, a central processing unit (CPU) block 104-3, a local static random access memory (SRAM) 104-4, a universal serial bus (USB) block 104-5, a serial block 104-6, a JPEG codec block 104-7, a resize block 104-8, a TV signal display block 104-9, and a memory card controller block 104-10. Each block is connected to each other via a bus line.

On an outer part of the processor 104, a synchronous dynamic random access memory (SDRAM) 103 for storing RAW-RGB image data, YUV image data, and JPEG image data, a RAM 107, a built-in memory 120, and a ROM 108 for storing a control program which is an imaging program are provided and connected to the processor 104 via bus lines. The control program stored in the ROM 108 includes a program as software which executes an imaging method according to an example of the present invention.

The lens barrel unit 7 includes a zoom optical system 7-1 having a zoom lens 7-1a, a focus optical system 7-2 having a focus lens 7-2a, an aperture unit 7-3 having an aperture stop 7-3a, and a mechanical shutter unit 7-4 having a mechanical shutter 7-4a, which form an imaging optical system. The zoom optical system 7-1, the focus optical system 7-2, the aperture unit 7-3, and the mechanical shutter unit 7-4 are driven by a zoom motor 7-1b, a focus motor 7-2b as a focus lens moving device, an aperture motor 7-3b and a mechanical shutter motor 7-4b, respectively. Each of the zoom motor 7-1b, the focus motor 7-2b, the aperture motor 7-3b and the mechanical shutter motor 7-4b is driven by a motor driver 7-5 and the operation of the motor driver 7-5 is controlled by the CPU block 104-3 of the processor 104. In the imaging apparatus according to the present invention, the focus lens moving device may be operated manually by a not-illustrated focus ring disposed on the outer peripheral of the lens barrel unit 7.

The zoom lens 7-1a and the focus lens 7-2a of the lens barrel unit 7 form the imaging lens to image an optical image of a subject on an imaging plane of the CCD 101 which is an image pickup device. The CCD 101 which is the image pickup device converts the optical image of the subject imaged on the imaging plane to an electric image signal and inputs the electric image signal to a front/end (F/E)-IC 102.

The F/E-IC 102 has a correlated double sampling (CDS) part 102-1, an automatic gain control (AGC) part 102-2 and an analog-digital (A/D) convertor 102-3 and performs predetermined processes on the image signal obtained from the subject optical image and converts the processed signal to digital signal. The obtained digital image signal is input to the CCD signal processing block 104-1. These signal processing operations are controlled by vertical driving (VD) signals and horizontal driving (HD) signals output from the CCD signal processing block 104-1 through a timing generator (TG) 102-4. The CCD signal processing block 104-1 performs white balance adjustment, a γ adjustment and the like on the digital image data input from the CCD 101 via the F/E-IC 102 and outputs the VD signals and the HD signals.

The CPU block 104-3 of the processor 104 controls a sound recording operation by a sound recording circuit 115-1. The sound recording circuit 115-1 records a sound signal which is obtained by being converted by a microphone 115-3 and amplified by a microphone amplifier 115-2 in accordance with a command of the CPU block 104-3.

The CPU block 104-3 controls operations of a sound reproduction circuit 116-1. The sound reproduction circuit 116-1 amplifies the sound signal stored in a memory by an audio amplifier (audio AMP) 116-2 and inputs the amplified sound signal to a speaker 116-3 so that sound is reproduced and output from the speaker 116-3.

The CPU block 104-3 controls and operates a strobe circuit 114 to allow the strobe light emitting part 3 to emit light. The CPU block 104-3 controls operations of a ranging unit 5 configured to measure a subject distance.

The CPU block 104-3 is connected to a sub CPU 109 disposed on an outer part of the processor 104 and the sub CPU 109 controls a display on a sub LCD 11 via a LCD driver 111. The sub CPU 109 is connected to the AF LED 8, the strobe LED 9, the remote control light receiving part 6, an operation part 112 having the switches SW1 to SW13 and a buzzer 113.

The USB block 104-5 is connected to a USB connector 122. The serial block 104-6 is connected to a RS-232C connector 123-2 via a serial driver circuit 123-1.

The TV signal display block 104-9 is connected to the LCD monitor 10 via the LCD driver 117 and the TV signal display block 104-9 is connected to a video jack 119 via the video amplifier (AMP) 118.

The memory card controller block 104-10 is connected to a card contact point of a memory card slot 191. When a memory card is inserted into the memory card slot 191, the memory card comes into contact with the card contact point and is electrically connected so that an image file is stored in the inserted memory card.

According to the imaging apparatus 1 having the above configuration, a predetermined signal processing on a subject image imaged on the light receiving surface of the CCD 101 via the imaging optical system is performed by the CCD signal processing block 104-1 in the processor 104 and the processed subject image is output to the LCD monitor 10 via the TV signal display block 104-9 and displayed. After the predetermined processing is performed on the subject image imaged on the light receiving surface of the CCD 101 via the imaging optical system by the CCD signal processing block 104-1, an enlarged image of a part specified according to an enlargement condition in the later described enlarged display processing is generated by the CCD signal processing block 104-3, and output to the LCD monitor 10 via the TV signal display block 104-9 and displayed.

Figure 5:
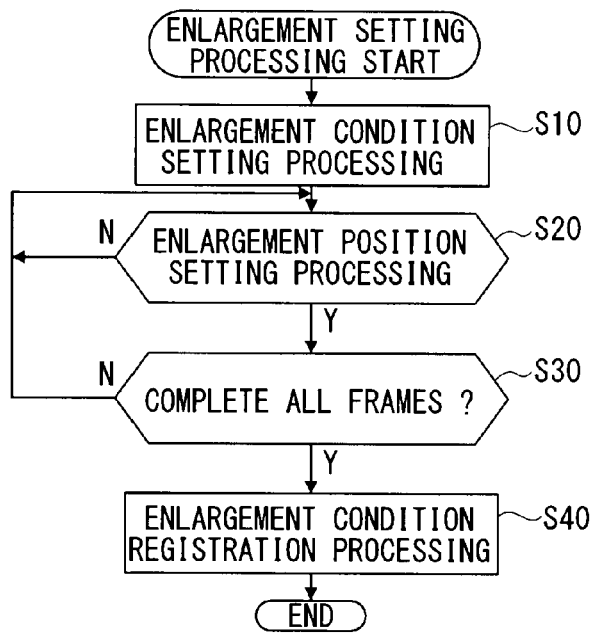
FIG. 5 is a flowchart showing an example of an enlargement setting processing in the imaging apparatus.

Next, an example of an imaging method performed in the imaging apparatus according to the present invention will be explained referring to drawings. FIG. 5 is a flowchart showing an example of an enlargement setting processing performed in the imaging method according to an example of the present invention. The enlargement setting processing is a processing for setting a condition for generating an enlarged image from a part of the image displayed on the LCD monitor 10. The processing is performed by a predetermined operation to the operation part 112 in the imaging apparatus 1. Information relating to the enlargement condition set in the processing (hereinafter, referred to as enlargement information) is stored in the built-in memory 120 in the imaging apparatus 1. In FIG. 5, S10, S20, . . . show processing steps, respectively. The menu switch SW6 provided on the back side of the imaging apparatus is pressed down so that an enlargement condition registration screen 110 is displayed on the LCD monitor 10 (S10). An example of the enlargement condition registration screen 110 is shown in FIG. 6.

Figure 6:
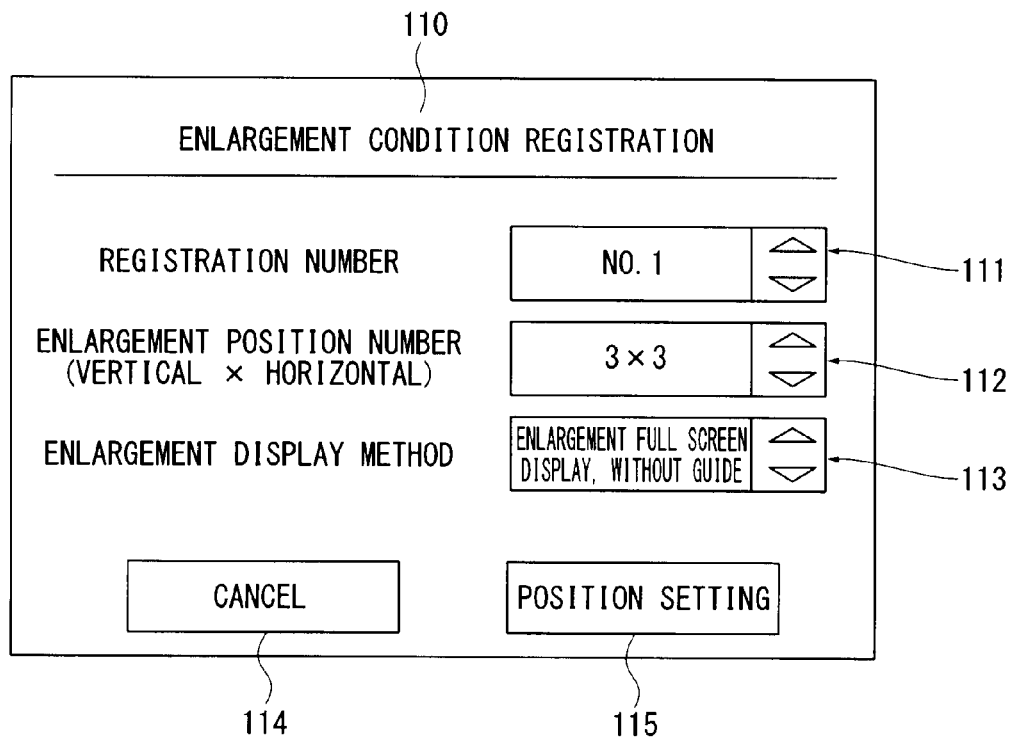
FIG. 6 is a schematic view showing an example of a screen displayed on a monitor of the camera in the enlargement setting processing.

In FIG. 6, the enlargement condition registration screen 110 has a menu 111 for specifying a "registration number" which is identification information for distinguishing each of a plurality of enlargement information, a menu 112 for specifying a number of parts to be enlarged in the subject image displayed on the LCD monitor 10, and a menu 113 for setting a display method (hereinafter, also referred to as enlargement display method) to display the enlarged image or images. In the enlargement condition registration screen 110 has a position setting button 115 for performing an operation for storing the enlargement information selected by the menus 111 to 113 in the built-in memory 120 which is the storage device and a cancel button 114 for performing a cancel of the operation for storing the selected enlargement information. The enlargement condition in each of the menus 111 to 113 may be selected by pressing the OK switch SW12 in a state where each of the menus is selected by moving a cursor with the upward switch SW7 and the downward switch SW10.

Here, parameters to be set in the enlargement condition registration screen 110 will be explained. A registration number (111) is identification information for distinguishing each piece of enlargement information in order to store a plurality of pieces of the enlargement information used in the later-described enlargement display processing in the storage device 120. The registration number (111) is capable of being selected from a pull-down format including No. 1, No. 2, No. 3, and the like by the operation of the upward switch SW7 and the downward switch SW 10.

The number of positions to be enlarged (112) (hereinafter, referred to as "enlarged position number") is the menu for selecting a number of parts to be enlarged at the same time in the subject image displayed on the LCD monitor 10. For example, when "3×3" is selected in FIG. 6, the image displayed on the LCD monitor 10 is divided into three in each of vertical and horizontal directions so that the image is divided into nine parts in total and each part is enlarged and displayed. The parameter as the enlarged position number (112) may be, for example, "1×1", "1×2", "1×3", "2×1", "2×2", "2×3", "3×1", "3×2" and the like.

The method for selecting the registration number (111) and the enlarged position number (112) is not limited to the above-mentioned method. For example, a predetermined condition may be input by the operation of the upward switch SW7, the right switch SW8, the downward switch SW10, and the left switch SW11 while displaying a not-illustrated (numeric keypad like) software keyboard on the LCD monitor 10.

The enlargement display method (113) is an enlargement condition for specifying a display method for displaying the enlarged image on the LCD monitor 10. In FIG. 6, "enlargement full screen display, without guide" is selected. As the enlargement display method (113), "enlargement full screen display, with guide", "background superimposed display", or the like may be selected.

After selecting the enlargement condition in each of the menus 111 to 113 and then moving the cursor on the position setting button 115, the OK switch SW12 is pressed down so that the process moves to an enlargement position setting processing (S20).

Figure 7A:
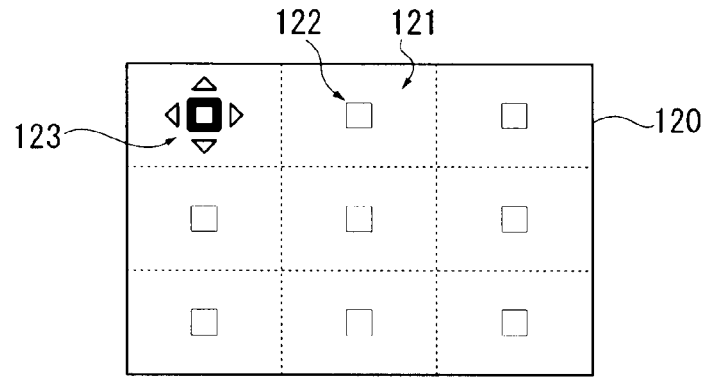
FIGS. 7A to 7C are schematic views each showing an example of the screen displayed on the monitor in the enlargement setting processing.
Figure 7B:
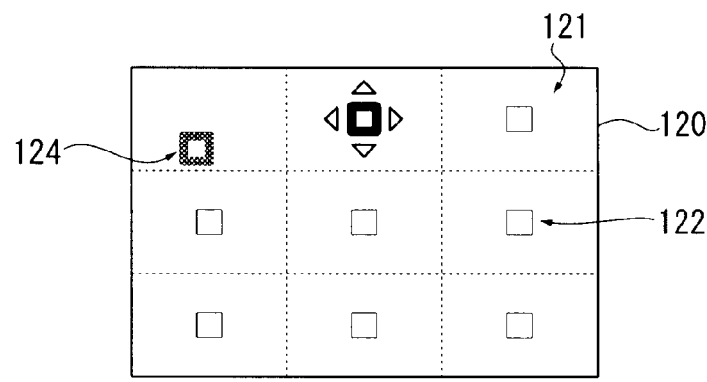
Figure 7C:
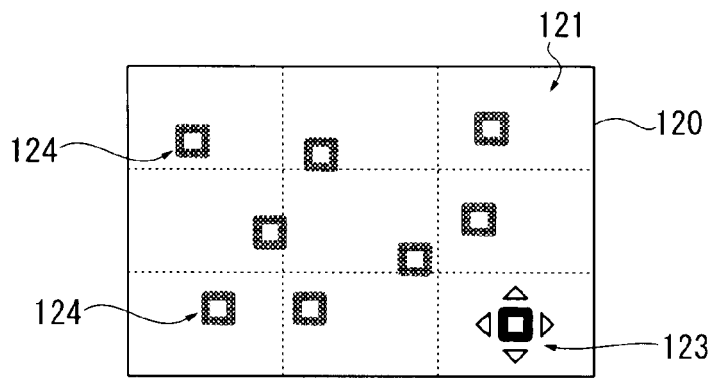

Next, by referring to FIG. 5, the enlargement position setting processing (S20) will be explained. The enlargement position setting processing (S20) is a processing for setting a position where a part of the subject image displayed on the LCD 10 is to be enlarged. Each of FIGS. 7A to 7C shows an example of a setting screen displayed on the LCD 10 in the enlarged position setting processing (S20). In FIGS. 7A to 7C, the enlargement position setting screen 120 in case where the enlarged position number (112) set in the enlargement condition registration screen 110 (see FIG. 6) is "3×3" is shown.

As shown in FIGS. 7A to 7C, the enlargement position setting screen 120 has divided position areas 121 obtained by dividing the screen in accordance with the enlarged position number (112), position frames 122, which are included in the position areas 121 to specify areas to be enlarged and displayed in the subject image, respectively, a setting frame 123 showing that the position frame 122 is in a moving and setting state, and an enlargement position 124 indicating a position set to be enlarged in the image. The position area 121 shows a set area which is a unit in which the later described positional information is set. Individual positional information showing a position to be enlarged in the image is set in each set area shown by the position area 121. The position area 121 (set area) corresponds to a display area on the LCD monitor 10. In other words, the position areas 121 which are the set areas correspond to individual display areas, respectively.

The setting frame 123 is capable of moving in upward, downward, left and right directions in the position area 121 by operating the upward switch SW7, the downward switch SW10, the left switch SW11, and the right switch SW8. FIG. 7A shows an example of a state where the setting processing on the position frame 122 according to the upper left position area 121 is performed. Therefore, the setting frame 123 is displayed on the upper left position area 121.

As shown in FIG. 5, the moving processing of the setting frame 123 is repeatedly performed until the OK switch SW12 is pressed ("N" in S20). After the setting frame 123 is moved to a position to be set, the OK switch SW12 is pressed ("Y" in S20), then the position of the setting frame 123 is set as an enlargement position 124.

Then, it is judged whether enlargement positions 124 are set in all of the position areas 121 or not (S30). If there is a position area 121 (unregistered position area) on which the enlargement position 124 is not set ("N" in S30), the processings from S20 are repeated. As shown in FIG. 7C, after a moving operation of the setting frame 123 in the last position area 121 (lower left position area 121) is performed (S20) and the setting frame 123 is moved to a position to be set, the OK switch SW12 is pressed ("Y" in S20, "Y" in S30), then the processing moves to the enlargement condition registration processing (S40).

Figure 8:
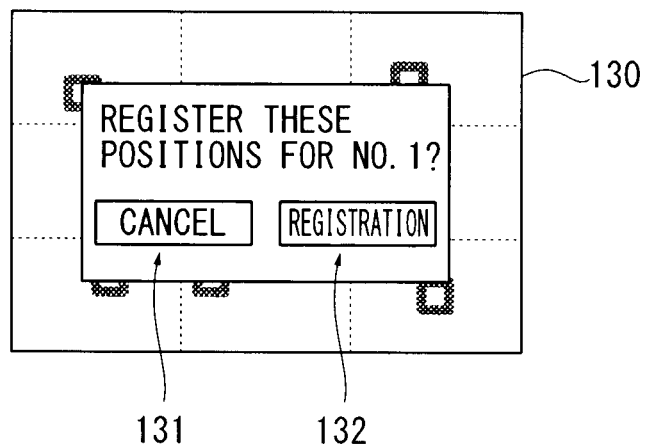
FIG. 8 is a schematic view showing an example of the screen displayed on the monitor in the enlargement setting processing.

In the enlargement condition registration processing (S40), an enlargement condition is stored in the storage device in accordance with a registration number (111) set in S10 as identification information. Here, the enlargement condition is information in which the enlarged position number (112) and information related to the enlargement display method (113) are associated with the positional information (for example, information specified by a two-dimensional coordinate in the LCD monitor 10) according to the enlargement positions 124 set in S20. FIG. 8 shows an example of a registration operation screen displayed on the LCD monitor 10 in the enlargement condition registration processing (S40). In FIG. 8, in the registration screen 130, a cancel button 131 and a registration button 132 are displayed. When the cursor is set on the cancel button 131 by using the right switch SW8 and the left switch SW11 and then the OK switch SW12 is pressed, the enlargement setting processing is finished. When the cursor is set on the registration button 132 and the OK switch SW12 is pressed, the above enlargement condition is stored in the storage device.

Figure 9:
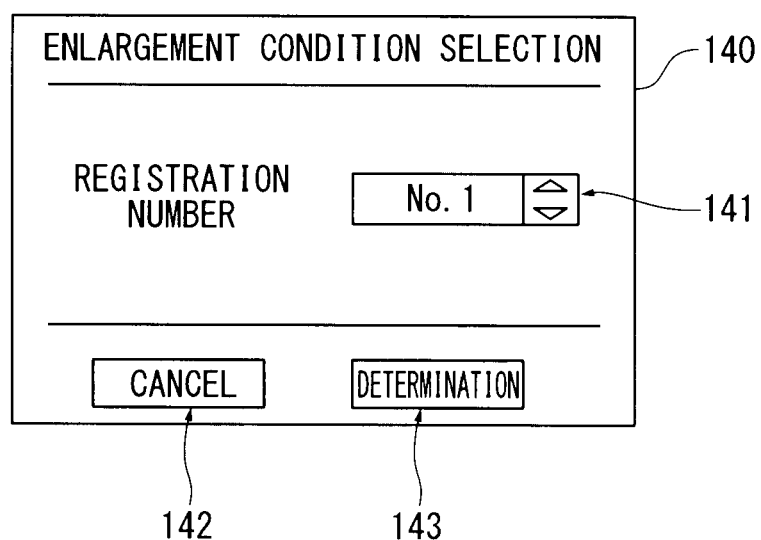
FIG. 9 is a schematic view showing an example of an enlargement condition selection screen in the imaging apparatus.

Then, a selection method of the enlargement condition to be used in an enlargement display processing in the later described imaging processing will be explained. FIG. 9 is an example of the enlargement condition selection screen 140 displayed on the LCD monitor 10 in the processing for selecting an enlargement condition according to the enlargement display processing. In FIG. 9, the enlargement condition selection screen 140 has a menu 141 for selecting a registration number (111), a cancel button 142, and a determination button 143. When the determination button 143 is pressed by operating the operating part 112 in a state where the enlargement condition selection screen 140 is displayed on the LCD monitor 10, the enlargement condition according to the registration number (111) indicated in the display of the menu 141 is read out from the storage device.

In the menu 141, identification information of a condition according to the later described automatic recognition mode other than the preset registration number (111) may be displayed to be selected.

Figure 10:
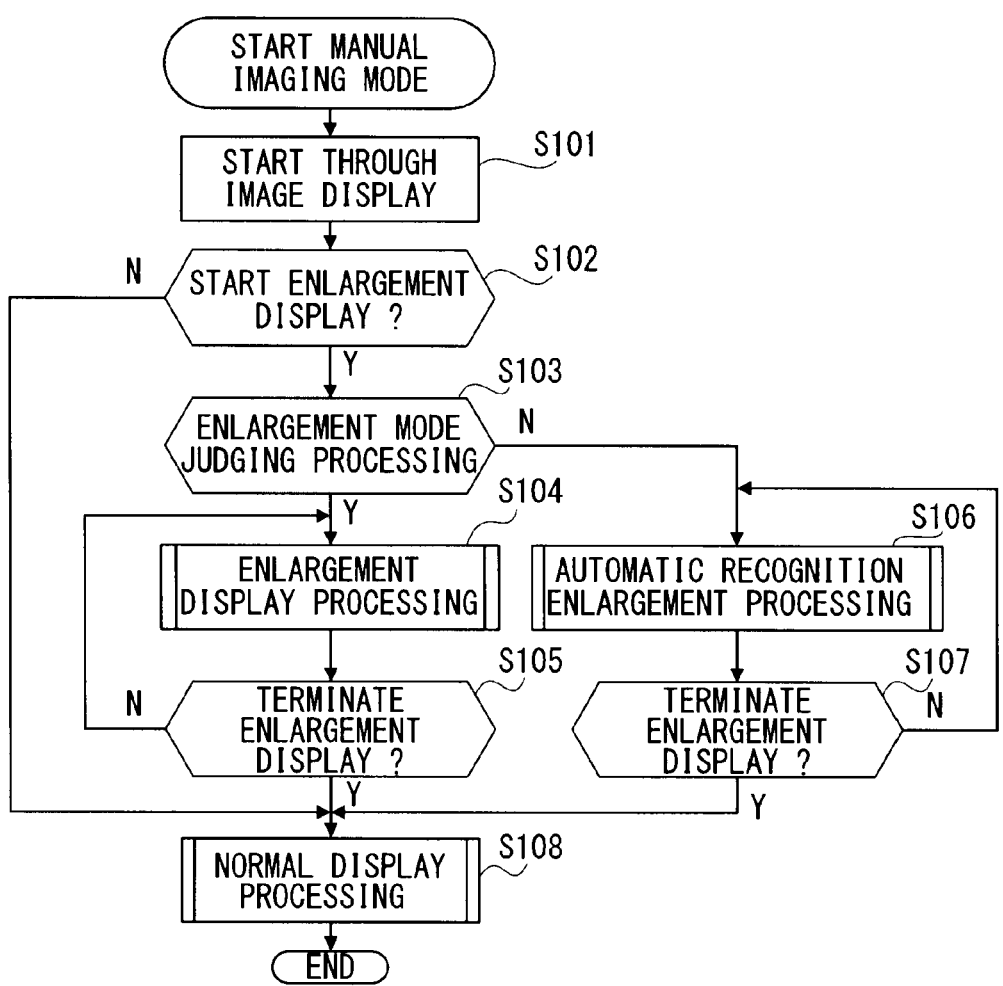
FIG. 10 is a flowchart showing an example of an imaging processing in the imaging apparatus.

Next, an example of the imaging method according to the present invention will be explained by referring to the flowchart in FIG. 10. In FIG. 10, S101, S102, . . . indicate processing steps, respectively. The imaging method according to an example of the present invention is performed in a manual mode. Therefore, in a state where the operation power of the imaging apparatus 1 is turned on and the manual mode is selected by the mode dial SW2, the following processings are started.

At first, a subject image to be displayed on the LCD monitor 10 which is the display device is generated from a subject optical image imaged on the light receiving surface of the image pickup device via the imaging optical system. A so-called through image display in that the subject image is continuously displayed at a predetermined timing is performed (S101). If an enlargement display starting operation is not performed ("N" in S102), the display on the LCD monitor 10 moves to a normal display processing (S108). The normal display processing (S108) is a processing for displaying an image of whole imaging field of view on the LCD monitor 10.

If the enlargement display starting operation is detected ("Y" in S102), an enlargement mode judging processing (S103) is performed. The enlargement display starting operation is, for example, pressing the menu switch SW6. In the enlargement mode judging processing (S103), a processing for judging an enlargement mode preliminarily specified in the imaging apparatus 1 is performed. The specifying processing of the enlargement mode is the processing of judging whether the preliminarily stored registration number is specified or not in the above described operations by referring to FIG. 9. If the registration number is specified ("Y" in S103), the enlargement condition stored in association with the specified registration number is read out and the enlargement display processing is performed (S104).

Figure 11:
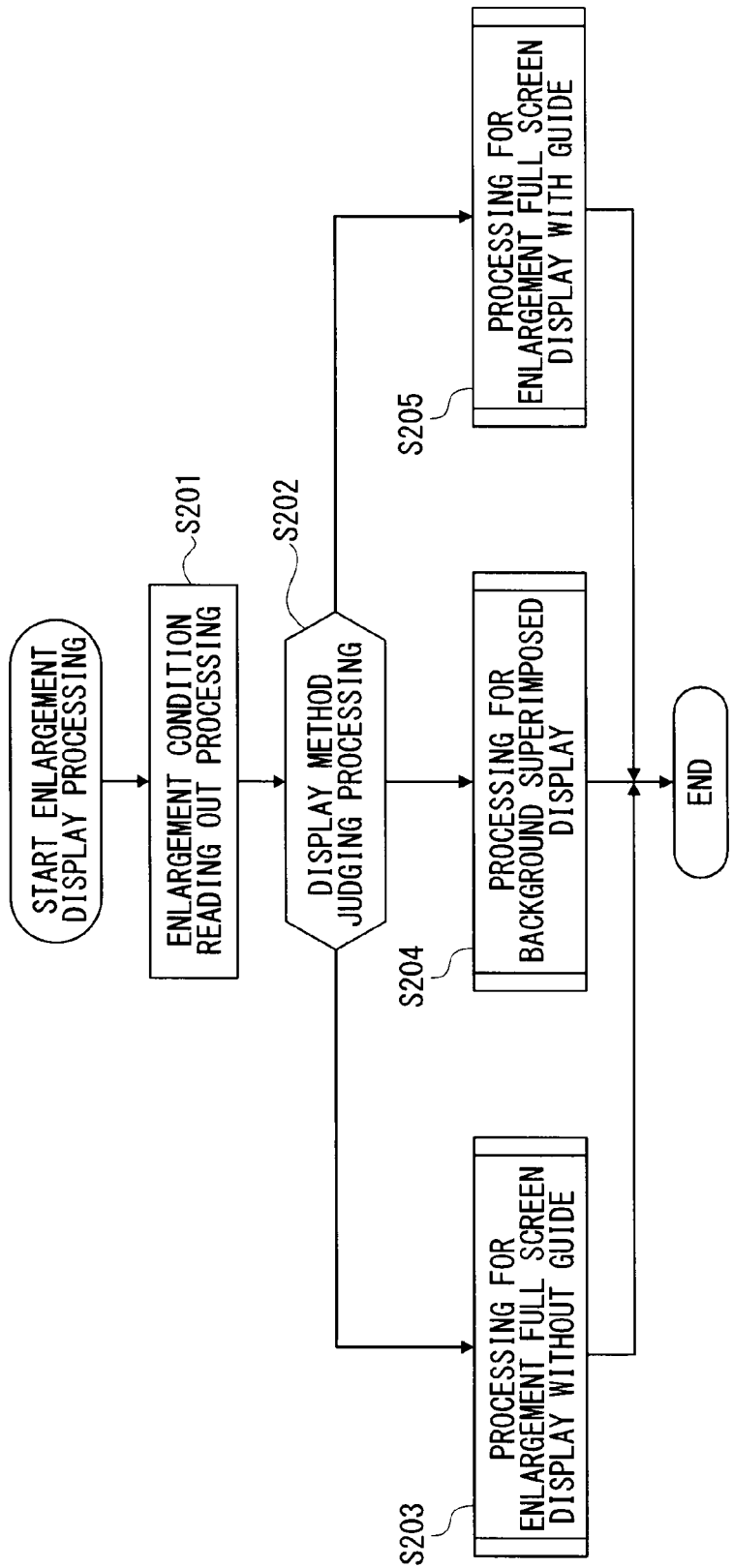
FIG. 11 is a flowchart showing an example of an enlargement display processing in the imaging apparatus.

The enlargement display processing (S104) will be explained. FIG. 11 is a flowchart showing an example of the enlargement display processing (S104). In FIG. 11, S201, S202, . . . indicate processing steps, respectively. The enlargement condition based on the registration number (111) selected in the previously performed enlargement condition selection (see FIG. 9) is read out from the storage device (S201). Then, the display method judging processing (S202) for judging a type of the enlargement display method (113) according to the read-out enlargement condition is performed. When the enlargement display method (113) is "enlargement full screen display, without guide", the processing S203 is performed. When the enlargement display method (113) is "background superimposed display", the processing S204 is performed. When the enlargement display method (113) is "enlargement full screen display, with guide", the processing S204 is performed.

Figure 13:
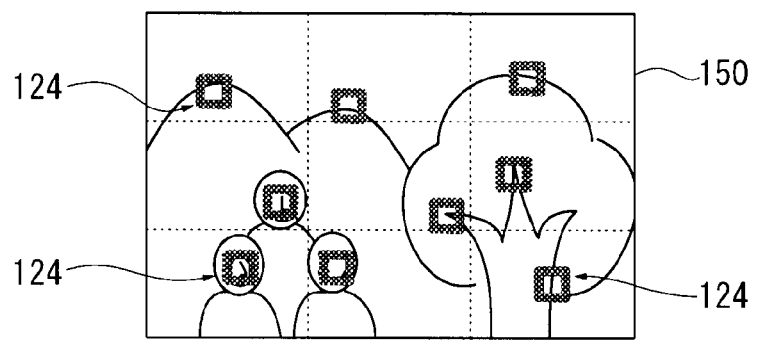
FIG. 13 is a schematic view showing an example of a subject image displayed on a monitor provided on the imaging apparatus.

An example of the display of the subject image on the LCD monitor 10 when the processing S203 is performed will be explained with reference to the drawings. FIG. 13 shows a display example of a through image. In FIG. 13, the enlargement positions 124 according to the registration number (111) preliminarily selected in the enlargement condition selection screen (see FIG. 9) is superimposed and displayed on the subject image 150 displayed on the LCD monitor 10.

Figure 14A:
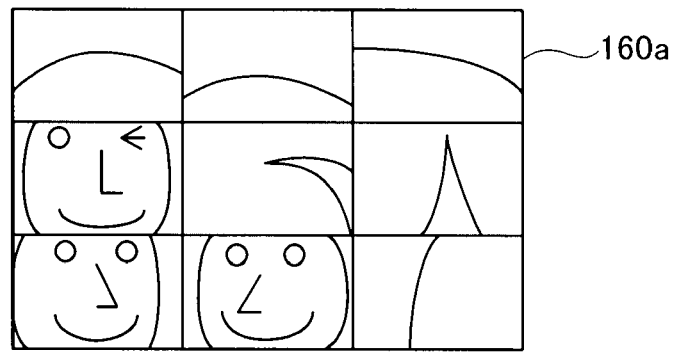
FIGS. 14A to 14C are schematic views showing screens displayed on the monitor provided on the imaging apparatus.
Figure 14B:
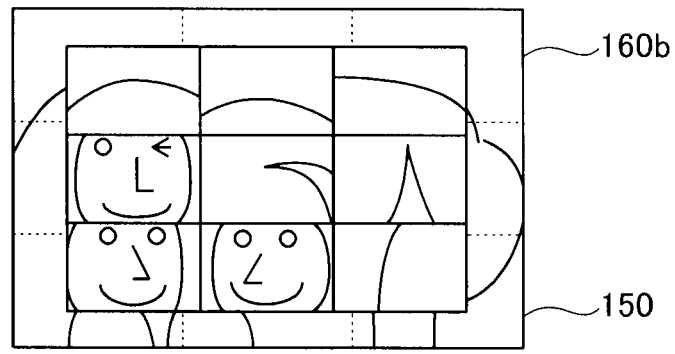
Figure 14C:
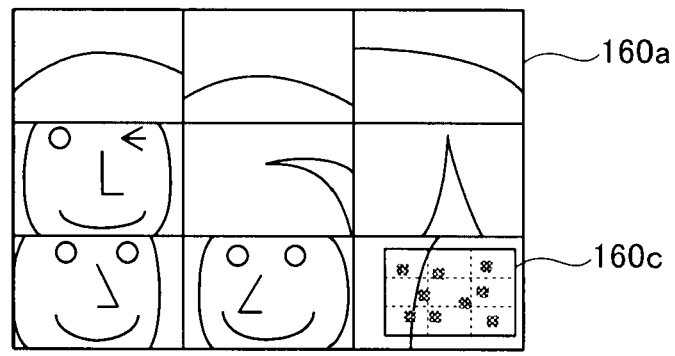

Each of FIGS. 14A to 14C shows an example of an image in which parts corresponding to the enlargement positions 124 in the subject image 150 are enlarged. In FIG. 14A, an enlarged image 160a is an example of the enlarged image according to "enlargement full screen display without guide".

FIG. 14B shows a display example when the processing S204 is performed. In FIG. 14B, in an enlarged image display 160b, an image in which the parts corresponding to the enlargement positions 124 in the subject image is enlarged and displayed is superimposed and displayed on the subject image 150 of the normal display. That is, the subject image and the enlarged images are displayed at the same time, and the enlarged images are superimposed on the subject image in a state where the subject image is visible.

FIG. 14C shows a display example when the processing S205 is performed. In FIG. 14C, a layout information 160c which is a guide display indicating positions in which the enlargement positions 124 are set in the subject image 150 which is a whole imaging field of view is superimposed and displayed on the enlarged image display 160a.

Although, in FIGS. 14A to 14C, lines indicating boundaries between enlarged images are shown for the sake of convenience, the lines are not necessarily used.

The display in which the enlargement positions 124 are superimposed on the subject image 150 as shown in FIG. 13 may be displayed on the LCD monitor 10 when the enlargement display starting operation is performed ("Y" in S102). Although, in this example, the three display methods may be selected, other display method can be selected.

The enlargement display processing (S104) is repeatedly performed until an enlargement display terminating operation is performed ("N" in S105). The enlargement display terminating operation is, for example, pressing the menu switch SW6 when the enlargement display processing (S104) is performed. When the enlargement display terminating operation is detected ("Y" in S105), the normal display processing (S108) is performed. In the normal display processing (S108), only the subject image 150 is displayed on the LCD monitor 10.

Then, an automatic recognition enlargement processing (S106) will be explained. The automatic recognition enlargement processing (S106) is performed when the enlargement display starting operation is detected ("Y" in S102), the registration number is not specified in the enlargement mode judging processing (S103) and the enlargement mode according to the automatic recognition mode is specified ("N" in S103).

Figure 12:
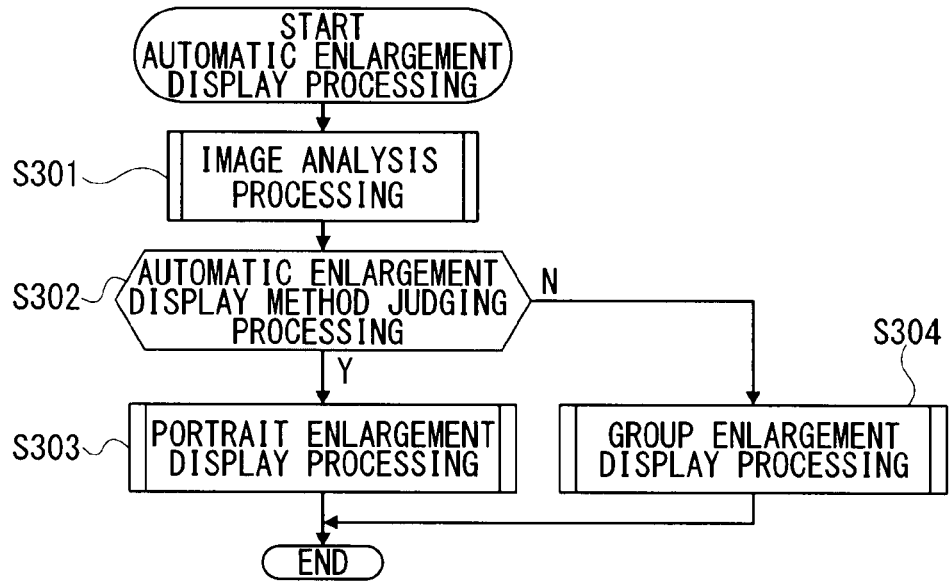
FIG. 12 is a flowchart showing an example of an automatic enlargement display processing in the imaging apparatus.

FIG. 12 is a flowchart showing an example of the automatic recognition enlargement processing (S106). In FIG. 12, S301, S302, . . . indicate processing steps, respectively. An image analysis processing according to the automatic recognition mode based on the selected registration number (111) in the previously performed enlargement condition selection (see FIG. 9) is performed (S301).

In the image analysis processing (S301), a predetermined analysis processing is performed on the subject image 150 (see FIG. 13) displayed as the though image. The analysis processing includes, for example, specifying a position of characteristic parts such as eyes or a nose of a person imaged in the subject image by using the known method.

Then, the automatic enlargement display method judging processing (S302) is performed. The automatic enlargement display method judging processing (S302) is a processing for judging the automatic enlargement display method set in the menu 141 in the enlargement condition selection screen 140 (see FIG. 9). In the automatic enlargement display method, for example, only either "portrait enlargement display" or "group enlargement display" can be selected. In this case, if it is judged that "portrait enlargement display" is selected ("Y" in S302), an image which is obtained by enlarging a specific part of the person imaged in the subject image is generated in accordance with the analysis result of the subject image in the image analysis processing (S301) and displayed on the LCD monitor 10. The specific part may be, for example, eyes of a person.

The image analysis processing (S301) is, for example, a processing for identify an image area, which is matched with pattern information, based on the pattern information. The pattern information is image pattern information for identifying a specific image area. The enlarged image is generated in an enlarged image generating device based on an image of the image area identified in the image analysis processing (S301).

Figure 15A:
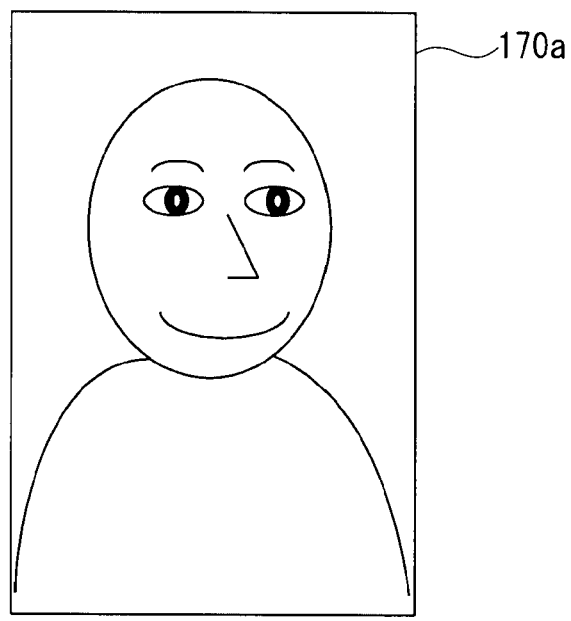
FIGS. 15A and 15B are schematic views each showing an example displayed on the monitor provided on the imaging apparatus.
Figure 15B:
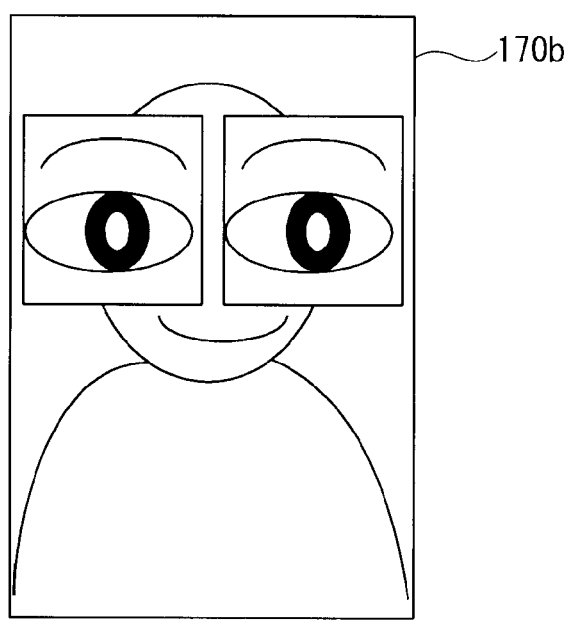

FIG. 15 shows a display example of the enlarged image according to "portrait enlargement display". As an example, the subject image 170a shown in FIG. 15A is displayed as a through image on the LCD monitor 10. The subject image 170a is a portrait image which is an image in which only one person is largely imaged. Therefore, an image 170b in which only parts of eyes of the person are enlarged from the subject image 170a is displayed on the LCD monitor 10. As described above, the portrait enlargement display processing (S303) is a processing for enlarging and displaying characteristic parts according to characteristic positions in the subject image 170a, which are specified in the image analysis processing (S301). In a case where the characteristic part specified in the image analysis processing (S301) is a nose part of the person in the subject image 170a, a nose part is enlarged in the not-illustrated enlarged image.

If it is judged that "group enlargement display" is selected ("N" in S302) in the automatic enlargement display method judging processing (S302), an image in which face parts of persons in the subject image are enlarged is generated in accordance with the analysis result of the subject image in the image analysis processing (S301) and displayed on the LCD monitor 10.

Figure 16A:
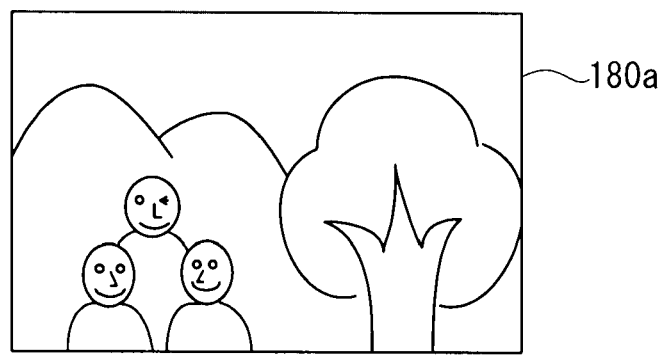
FIGS. 16A and 16B are schematic views each showing an example displayed on the monitor provided on the imaging apparatus.
Figure 16B:
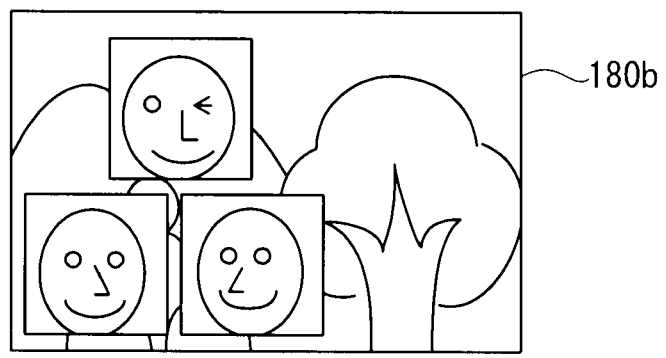

FIG. 16 shows a display image of the enlarged image according to "group enlargement display". In this case, the subject image 180a shown in FIG. 16A is displayed as a through image on the LCD monitor 10. In the subject image 180a, a plurality of persons are imaged (group image). Therefore, an image 180b in which face parts of all of the plurality of persons in the subject image 180a are enlarged is generated and displayed on the LCD monitor 10 (see FIG. 16B). As described above, the group enlargement display processing (S304) is a processing for enlarging and displaying positions of "persons' faces" in the subject image 180a, which are characteristic parts specified in the image analysis processing (S301). If the characteristic part specified in the image analysis processing (S302) is a part of a specific person's face in the subject image 180a, the person's face is enlarged in a not-illustrated enlarged image.

The automatic recognition enlargement processing (S106) is repeatedly performed until the enlargement display terminating operation is performed ("N" in S107). The enlargement display terminating operation is, for example, pressing the menu switch SW6 when the automatic recognition enlargement processing (S106) is performed. If the enlargement display terminating operation is detected ("Y" in S107), the normal display processing (S108) is performed. In the normal display processing (S108), only the subject image 150 is displayed on the LCD monitor 10.

As described above, in the imaging apparatus of this example of the present invention, an enlarged image which is an image in which a plurality of image areas in the subject image are enlarged in accordance with preliminarily set enlargement positions can be displayed at the same time. If the automatic recognition mode is selected, an enlarged image based on the image analysis result of the subject image in accordance with the selected mode can be displayed.

As described above, in an imaging apparatus according to an example of the present invention, images in each of which a part of the subject image is enlarged can be displayed at the same time. Therefore, when a focus operation is manually performed, a focus operation can be performed while visually confirming a display of enlarged parts to be focused in a whole imaging field of view. Further, a plurality of parts to be focused can be visually confirmed at the same time. Therefore, the imaging operation can be performed without missing photo opportunities even in a manual mode imaging operation.

An imaging apparatus and an imaging method according to an embodiment of the present invention may be applied to a digital camera, a camera installed in a mobile phone, and other various cameras.

According to an example of the present invention, even in a case where a position, focus of which is to be confirmed changes from moment to moment when imaging with a manual focusing operation, focus adjustment can be easily and immediately performed without missing photo opportunities. Operability in a manual focusing operation can be improved without installing special devices or mechanisms in the imaging apparatus.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. An imaging apparatus comprising:
an imaging lens forming an optical image of a subject;
an image pickup device outputting an image signal according to the optical image of the subject formed by the imaging lens;
a display device displaying a subject image according to the image signal; and
an image processor converting the image signal to data in an image data format to be displayed on the display device;
wherein the image processor has
an enlarged image generation device generating an enlarged image of each of plurality of enlargement areas based on plurality of pieces of positional information stored in a storage device;
an enlargement display device displaying the plurality of enlarged images on the display device;
a setting screen display device displaying on the display device an enlargement display position setting screen for setting a plurality of pieces of positional information specifying areas to be enlarged of image areas included in the subject image; and
an operation device to be operated when the enlargement display position setting screen is displayed on the display device, wherein
the positional information is determined in accordance with an operation of the operation device when the enlargement display position setting screen is displayed on the display device and is stored in a storage device.

2. The imaging apparatus according to claim 1, wherein the enlargement display device displays both of the subject image and the enlarged images.

3. The imaging apparatus according to claim 1, wherein the enlargement display device displays the enlarged images and the subject image in a superimposed state so as to allow the subject image to be visible.

4. The imaging apparatus according to claim 1, wherein the positional information is information determined based on pattern information on the subject image.

5. The imaging apparatus according to claim 1, wherein
the enlargement display position setting screen includes a plurality of setting areas; and
the positional information of each of the plurality of setting areas is stored in the storage device.

6. The imaging apparatus according to claim 5, wherein
the display device includes a display area having a plurality of individual display areas; and
the plurality of setting areas respectively correspond to the plurality of individual display areas.

7. The imaging apparatus according to claim 1, further comprising:
a layout display device displaying layout information indicating a position of the enlarged image in the subject image on the display device.

8. An imaging method performed in an image apparatus comprising:
forming, by an imaging lens, an optical image of a subject;
outputting, by an image pickup device, an image signal according to the optical image of the subject formed by the imaging lens;
displaying, by a display device, a subject image according to the image signal;
converting, by an image processor, the image signal to data in an image data format to be displayed on the display device;
generating, by an enlarged image generation device of the image processor, an enlarged image of each of plurality of enlargement areas based on plurality of pieces of positional information stored in a storage device;
displaying the plurality of enlarged images on the display device;
displaying on the display device an enlargement display position setting screen for setting a plurality of pieces of positional information specifying areas to be enlarged of image areas included in the subject image; and
receiving an operation at an operation device when the enlargement display position setting screen is displayed on the display device, wherein
the positional information is determined in accordance with an operation of the operation device when the enlargement display position setting screen is displayed on the display device and is stored in a storage device.

9. A non-transitory computer readable medium that stores a program which executed by an imaging apparatus, causes the imaging apparatus to perform a method comprising:
forming, by an imaging lens, an optical image of a subject;
outputting, by an image pickup device, an image signal according to the optical image of the subject formed by the imaging lens;
displaying, by a display device, a subject image according to the image signal;
converting, by an image processor, the image signal to data in an image data format to be displayed on the display device;
generating, by an enlarged image generation device of the image processor, an enlarged image of each of plurality of enlargement areas based on plurality of pieces of positional information stored in a storage device;

displaying the plurality of enlarged images on the display device;

displaying on the display device an enlargement display position setting screen for setting a plurality of pieces of positional information specifying areas to be enlarged of image areas included in the subject image; and receiving an operation at an operation device when the enlargement display position setting screen is displayed on the display device, wherein the positional information is determined in accordance with an operation of the operation device when the enlargement display position setting screen is displayed on the display device and is stored in a storage device.

* * * * *